United States Patent
Jansen et al.

(10) Patent No.: US 9,387,414 B2
(45) Date of Patent: Jul. 12, 2016

(54) MASS TRANSFER TRAY

(71) Applicant: JULIUS MONTZ GMBH, Hilden (DE)

(72) Inventors: Helmut Jansen, Dormagen (DE); Thomas Rietfort, Bottrop (DE)

(73) Assignee: JULIUS MONTZ GMBH, Hilden (DE)

( * ) Notice: Subject to any disclaimer, the term of this patent is extended or adjusted under 35 U.S.C. 154(b) by 10 days.

(21) Appl. No.: 14/418,381

(22) PCT Filed: Nov. 19, 2013

(86) PCT No.: PCT/EP2013/003476
§ 371 (c)(1),
(2) Date: Jan. 29, 2015

(87) PCT Pub. No.: WO2014/206433
PCT Pub. Date: Dec. 31, 2014

(65) Prior Publication Data
US 2015/0182872 A1     Jul. 2, 2015

(30) Foreign Application Priority Data
Jun. 24, 2013   (DE) .......................... 10 2013 010 625

(51) Int. Cl.
*B01F 3/04*      (2006.01)
*B01D 3/20*      (2006.01)
*B01D 3/32*      (2006.01)

(52) U.S. Cl.
CPC *B01D 3/20* (2013.01); *B01D 3/205* (2013.01); *B01D 3/324* (2013.01); *B01F 3/04078* (2013.01)

(58) Field of Classification Search
CPC .......... B01D 3/20; B01D 3/205; B01D 3/324; B01F 3/04078

USPC ................................. 261/114.1, 114.2, 114.5
See application file for complete search history.

(56) References Cited

U.S. PATENT DOCUMENTS

| 803,394 A | 10/1905 | Bogoaivlensky |
| 1,982,226 A * | 11/1934 | Monro .................. B01D 3/205 |
| | | 202/158 |

(Continued)

FOREIGN PATENT DOCUMENTS

| DE | 766545 B | 12/1952 |
| DE | 19622955 A | 12/1997 |

(Continued)

*Primary Examiner* — Charles Bushey
(74) *Attorney, Agent, or Firm* — Andrew Wilford

(57) ABSTRACT

The invention relates to a mass transfer tray of a column with a liquid feed on the tray feed side and a liquid discharge on the opposite tray discharge side, and with multiple profile-shaped channels of a U-shaped cross section that are arranged in the tray between the feed and the discharge, parallel to one another and transversely in relation to the direction of liquid flow, and form between them gas passage slits which are covered over by elongated profile-shaped hoods, which have an inverted U-shaped cross section, wherein the side walls of the channels reach into the hoods, and so the channel side walls are covered over by the hood side walls by a height that is less than the height of the channel side walls and the height of the hood side walls, wherein the liquid flows alternately in opposite directions in the channels, and so in every second channel the liquid flows in one direction and in the channels lying in between the liquid flows in the opposite direction, and wherein the hoods are set higher than the channels in the case of the channels and hoods that are closer to the tray feed side, and consequently the heights over which they cover one another are less than in the case of the channels and hoods that are closer to the tray discharge side.

8 Claims, 2 Drawing Sheets

(56) References Cited

U.S. PATENT DOCUMENTS

| | | | | |
|---|---|---|---|---|
| 2,531,030 A | * | 11/1950 | Craft | B01D 3/18 261/114.2 |
| 2,578,670 A | * | 12/1951 | Carleton | C11B 3/001 202/153 |
| 2,627,397 A | | 2/1953 | Hurshel | |
| 2,690,332 A | * | 9/1954 | Jorgensen | B01D 3/20 261/114.1 |
| 2,692,128 A | | 10/1954 | Bowles | |
| 2,747,849 A | | 5/1956 | Colburn | |
| 2,753,166 A | * | 7/1956 | Bergman | B01D 3/20 261/114.2 |
| 3,022,054 A | | 2/1962 | Kotzebue | |
| 3,025,041 A | | 3/1962 | Sandler | |
| 3,047,278 A | * | 7/1962 | Streuber | B01D 53/18 202/158 |
| 3,693,948 A | * | 9/1972 | Kloss | B01D 3/20 261/114.2 |
| 3,914,352 A | * | 10/1975 | Guerrieri | B01D 3/205 261/114.5 |
| 4,578,153 A | | 3/1986 | Newton | |
| 4,711,745 A | | 12/1987 | Lockett | |
| 7,118,098 B2 | | 10/2006 | Thiel | |
| 8,408,026 B2 | * | 4/2013 | Kovak | B01D 3/008 202/158 |

FOREIGN PATENT DOCUMENTS

| | | |
|---|---|---|
| FR | 1082959 B | 6/1954 |
| GB | 829894 B | 3/1960 |

\* cited by examiner

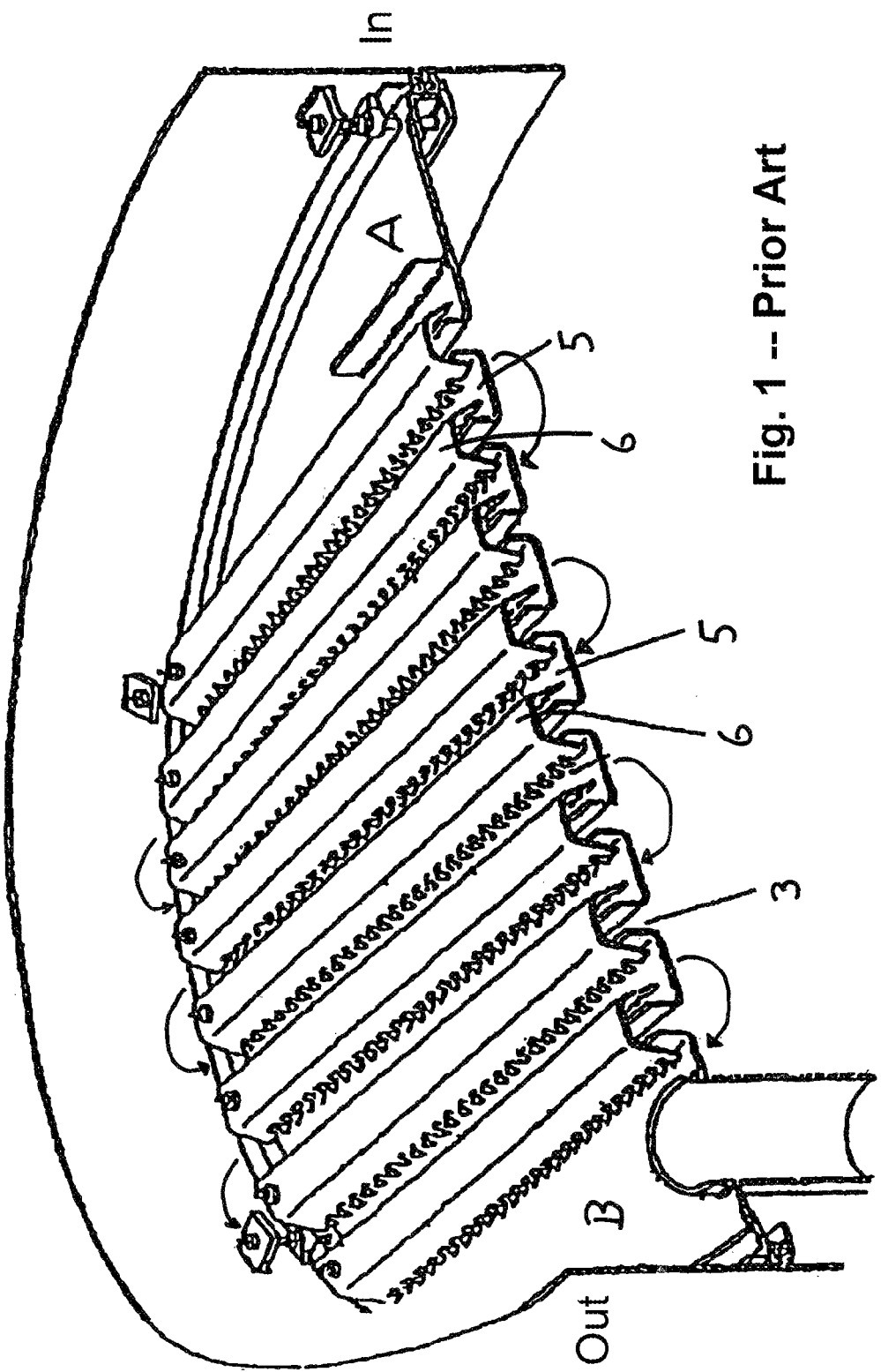
Fig. 1 – Prior Art

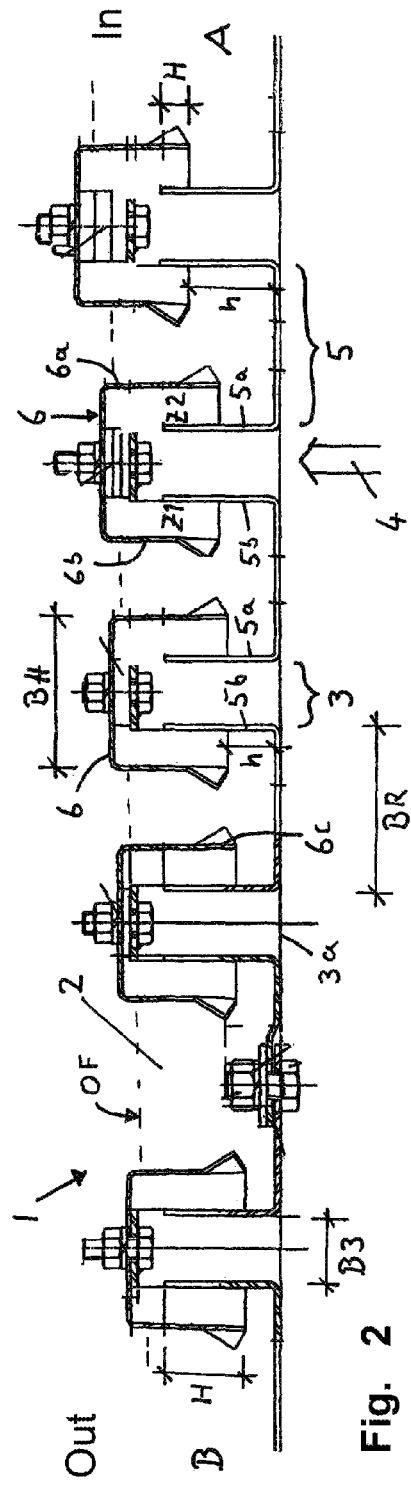
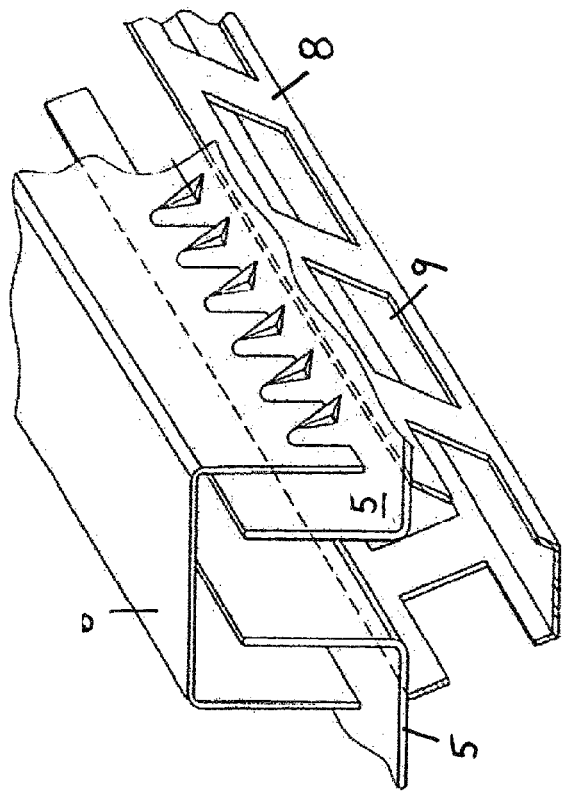

MASS TRANSFER TRAY

CROSS REFERENCE TO RELATED APPLICATIONS

This application is the US-national stage of PCT application PCT/EP2013/003476 filed 19 Nov. 2013 and claiming the priority of German patent application 102013010625.7 itself filed 24 Jun. 2013.

The invention relates to a mass-transfer tray of a column with a liquid feed on the tray input side and a liquid discharge on the opposite tray discharge side, and with multiple channel profiles of a U-section that are arranged in the tray between the feed and the discharge, parallel to one another and extending transversely to the direction of liquid flow, and form between them gas slots that vertically overlap elongated profile-shaped hoods of inverted U-section, the side walls of the channels extending up into the hoods such that the channel side walls vertically overlap the hood side walls by a height that is less than the height of the channel side walls and the height of the hood side walls.

Such a mass-transfer tray is known from DE 102 43 625 [U.S. Pat. No. 7,118,098] and is illustrated in the appended FIG. 1. In these known mass-transfer trays it has been shown that the foam layer forming on the tray is irregular and often incomplete, so that the degree of efficiency is insufficient.

The object of the invention is to improve a mass-transfer tray of the type referred to above so that the degree of efficiency is uniform for the entire surface, and that the channels and hoods closer to the tray input side are set higher than the channels and consequently the heights over which they vertically overlap each other are less than for the channels and hoods that are closer to the tray discharge side.

Due to the long guidance of the liquid in a serpentine manner successively via all the channels the liquid is held substantially longer above the same tray, so that a greater mass transfer is achieved. Furthermore the mass transfer can be carried out even more intensively and uniformly due to the decreasing heights of the hoods.

In this case it is proposed that from the tray input side to the tray discharge side the heights of the hoods relative to the channels decrease continuously or discontinuously and the heights over which they vertically overlap each other increase continuously.

An alternative solution is that for the gas slots located closer to the tray input side the slot width is greater than for the gas slots located closer to the tray discharge side. In this connection it is proposed that from the tray input side to the tray discharge side the slot width decreases continuously or discontinuously.

A further alternative solution is that the lower edges of the hood walls have a plurality of notches or openings that are open downward and of which the height and/or width is greater for the hoods located closer to the tray input side than for the hoods located closer to the tray discharge side. In this connection it is proposed that from the tray input side to the tray discharge side the height and/or width of the notches decreases continuously or discontinuously.

A further alternative solution is that in the gas feed regions to the gas slots below the tray in each case at least one throttle element is fastened to the tray, the throttling passage opening(s) of the throttle element being greater for gas slots located closer to the tray input side than for the tray discharge side. In this connection it is also proposed that from the tray input side to the tray discharge side the size of the holes of the throttle elements decreases continuously or discontinuously.

It is advantageous if the height of the channel side walls with the same hood configuration/arrangement decreases from the tray input side to the tray discharge side.

In each of these four solutions the significant advantage is achieved that the flow resistance of the gas flowing upward from the bottom through the mass-transfer tray is of the same magnitude over the entire surface of the mass-transfer tray, although the height of the fluid level on the upper face of the mass-transfer tray decreases from the tray input side to the tray discharge side. Such a uniformity of the flow resistance results in the foam layer being uniform and without gaps over the entire surface of the mass-transfer tray, so that the efficiency is uniform over the entire surface of the tray is and thus the tray is highly effective.

Embodiments of the invention are illustrated in the drawings and are described in greater detail below. In the drawings:

FIG. 1 is a perspective view of a mass-transfer tray according to the prior art, FIG. 2 is a vertical section through a mass-transfer tray corresponding to a first embodiment of to the invention; and FIG. 3 is a perspective view of a part of a mass-transfer tray corresponding to a further embodiment of the invention.

The mass-transfer tray 1 according to the invention extends horizontally in a column in which a plurality of such trays 1 are held one above the other. Each tray carries a layer 2 of liquid through which gas 4 flows from below through gas slots 3. As a result a foam layer composed of liquid and gas bubbles in which the mass transfer takes place forms above the tray 1. On one side (input side A) the liquid flows on the edge of the tray 1 onto the floor in order to flow over the entire tray and to flow off on the other side (discharge side B) on the edge of the tray in order to extend down the tray located below.

Between the input side A and the discharge side B the tray is formed as a row of U-section channel profiles 5 that are parallel to one another and form between them parallel gas slots 3. In this case adjacent vertical side walls 5a and 5b that confront one another of two channels form the side walls of the gas slots 3. It is important that the liquid flows alternately oppositely in adjacent channels 5 such that in every other channel 5 the liquid flows in one direction and in the flanking channels 5 flows in the opposite direction. The arrows in FIG. 1 show the course of the liquid in the channels 5 and between hoods 6.

An elongate profiled hood 6 of inverted U-section is engaged over each gas slot 3. Vertical side walls 6a and 6b of each hood project into the intermediate or internal spaces of two neighboring channels 5, so that lower edges of the hood side walls 6a and 6b are lower than upper edges of the channel side walls 5a and 5b. Thus the hood side walls 6a and 6b vertically overlap the channel side walls 5a and 5b with a height H.

Since a width BH of the hoods 6 centered between the channels 5 is greater than a slot width B3, gas flowing upward through the slot 3 is deflected by the hood on two sides into spaces Z1 and Z2 between the hood walls and the channel walls, in order there to flow around downward under the lower edge of the hood walls 6a, 6b and then from there to flow upward again to the surface of the liquid.

The lower edges of the hood side walls 6a and 6b have vertical notches 6c through which the gas escapes into the spaces between the hoods. In this case the slots 6c can form oblique guide surfaces that give the gas and the liquid a flow direction.

A height HF of the liquid layer on the tray 1 decreases from the input side A to the discharge side B and accordingly in a first solution illustrated in FIG. 2 the hoods 6 closer to the input side A are set higher than the hoods closer to the discharge side. Thus the overlap H of the hood and side walls close to the input side A is less than close to the discharge side B. This preferably ensures that from the tray input side A to the tray discharge side B the overlaps H of the hoods 6 decrease continuously relative to the channels 5 and the heights over which they overlap one another H continuously increase.

In a second solution, which is alternative or additional to the first solution, the width B3 of the gas slots 3 is different, i.e. their width decreases in particular continuously from the input side A to the discharge side B. Thus the rising vapor streams close to the feed are wider and downstream of the discharge are narrower, so that in turn in the deeper liquid layer closer to the feed more gas is available for throughflow than in the shallower layer close to the discharge.

In a third embodiment this effect is achieved in that the notches 6c on the lower edge of the hood walls decrease continuously in particular in their height and/or width from the input side A to the discharge side. This again takes place as an alternative or addition to the first or second solution, in order to have more gas available in the deeper liquid layer.

In a fourth additional or alternative embodiment (FIG. 3), below the tray 1 or the lower tray surface and thus on the underside of each pair of channels 5 a throttle element 8 is fastened that in each case covers the mouth 3a of the gas slot. Each throttle element that is in particular profile-shaped and parallel to the channels and hoods has holes 9 that determine the quantity of gas entering the respective gas slots 3. This ensures that the size and/or the number of the gas holes of the throttle elements close to the input side A is greater than it is close to the discharge side B, and this is again implemented continuously. This solution also means that again in the deeper liquid layer closer to the feed more gas is available for throughflow than in the shallower layer close to the discharge.

The invention claimed is:

1. A mass-transfer tray for a column, the tray having a liquid feed on a tray input side and a liquid discharge side on an opposite tray discharge side for flow of liquid in a horizontal flow direction from the input side to the discharge side, the tray comprising:
   a plurality of upwardly open U-section channels extending spacedly parallel to one another and transverse to the liquid-flow direction and each having a pair of upwardly and transversely extending channel side walls, the tray being configured such that liquid fed in at the input side passes in a serpentine from the input side to the output side with flow in each channel being opposite to flow in the immediately adjacent channel, each channel forming with at least one adjacent channel a transversely extending and vertically open slot, whereby gas passing upward through the column passes upwardly through the slots; and
   respective downwardly open inverted U-section profile hoods above the slots, extending spacedly parallel to one another and transverse to the gas flow direction, and each having a pair of downwardly projecting hood side walls each extending into a respective one of the channels and spaced transversely from the respective channel side walls, upper edges of the channel side walls being above lower edges of the respective hood side walls, the channels and hoods forming transversely elongated passages through which the gas flows, the passages being of decreasing flow cross section from the input side to the output side such that more gas bubbles up through the liquid adjacent the input side than adjacent the output side.

2. The mass-transfer tray defined in claim 1, wherein the channels are provided underneath each of the slots with a flow restricting element having openings through which gas must flow prior to passing upward through the slots, the openings being of decreasing flow cross section from the input side to the output side.

3. The mass-transfer tray defined in claim 1, wherein a vertical overlap defined between the upper edge of each channel side wall ant the lower edge of the immediately adjacent hood side wall increases from the input side to the output side.

4. The mass-transfer tray defined in claim 1, wherein each of the slots has a respective predetermined transverse width, and the widths are increasingly smaller from the input side to the output side.

5. The mass-transfer tray defined in claim 1, wherein each of the hood side walls is formed with a transversely extending row of downwardly open and horizontally throughgoing notches, the notches being of a flow cross section decreasing from the input side to the output side.

6. The mass-transfer tray defined in claim 5, wherein a horizontal width of the notches decreases from the input side to the output side.

7. The mass-transfer tray defined in claim 5, wherein a vertical height of the notches decreases from the input side to the output side.

8. The mass-transfer tray defined in claim 5, wherein each side wall is formed to one horizontal side of each of the notches with an angled flow-directing flap.

* * * * *